H. J. HAIGH.
BAKING PAN.
APPLICATION FILED MAR. 28, 1919.
1,321,204.
Patented Nov. 11, 1919.
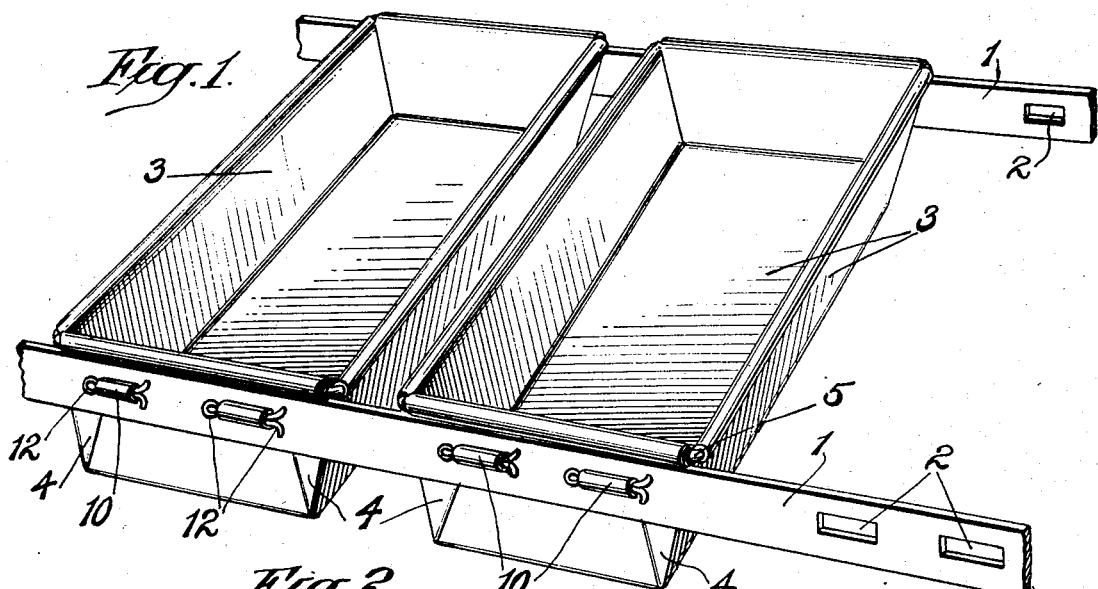
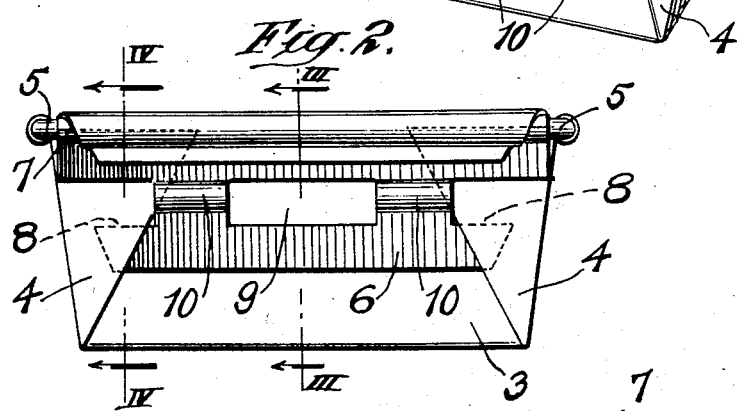
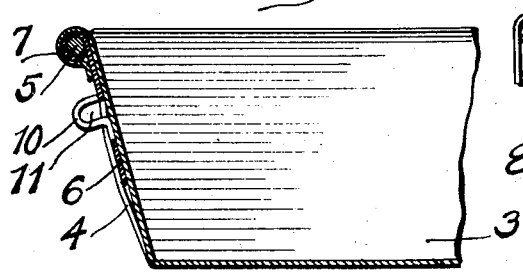
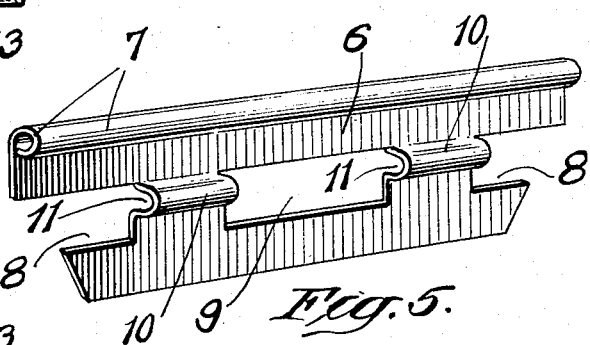
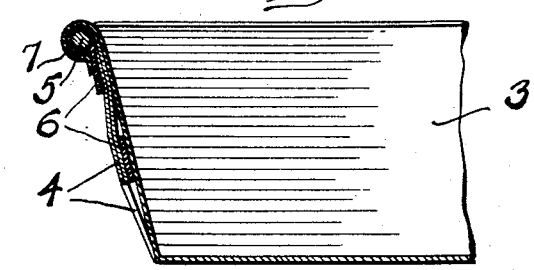
INVENTOR
Harry J. Haigh
BY
ATTORNEY

UNITED STATES PATENT OFFICE.

HARRY J. HAIGH, OF NEW BRIGHTON, NEW YORK.

BAKING-PAN.

1,321,204.   Specification of Letters Patent.   Patented Nov. 11, 1919.

Application filed March 28, 1919. Serial No. 285,824.

*To all whom it may concern:*

Be it known that I, HARRY J. HAIGH, a citizen of the United States, and a resident of New Brighton, county of Richmond, city and State of New York, have invented new and useful Improvements in Baking-Pans, of which the following is a specification.

This invention relates to improvements in baking pans of the type commonly known as multiple baking pans in which a plurality of individual pans are connected together to adapt the same to be handled as a unit. Pans of this type are more commonly used in bakeries and are subjected to severe usage, and, as is well known, the end pans of a set become worn, deformed, or damaged much more rapidly than the intermediate pans.

The present invention has for one of its objects the provision of simple, strong and durable means for detachably connecting the individual pans together, said means being so constructed as to securely hold the pans in fixed relation with each other while at the same time permitting ready removal of a damaged pan and substitution of a new pan in place thereof.

Another important object of the invention is to provide a knock-down multiple pan the parts of which, including both the individual pans and the pan-connecting members, may be of standard construction and interchangeable.

A further important object of the invention is to provide a detachable and interchangeable pan unit comprising an individual pan having means rigidly held to the opposite ends of the pan against vertical movement, against movement transversely of the ends of the pan, and against movement toward or from the ends of the pan, said means being adapted to be detachably connected with the pan-connecting bars and being held to the pan without the employment of rivets or other fastening means extending through the pan walls or projecting within the pan.

Another object of the invention is to provide a multiple pan comprising a plurality of individual pans rigidly but detachably held in spaced relation by a pair of side bars detachably held to connecting devices permanently held to the end portions of the pan-reinforcing wires and permanently interlocked with the corner folds of the pans, whereby relative movement between said devices and the pans in any direction is prevented and the pans and side bars are held against relative movement in any direction without the necessity of employing spacing devices between the side walls of adjacent pans and end bars or intermediate transverse connections between the side bars.

In the drawings, Figure 1 is a fragmentary perspective view of a multiple baking pan embodying the invention;

Fig. 2 an enlarged end elevation of one of the detachable and interchangeable pan units;

Fig. 3 a fragmentary vertical section on the line III—III of Fig. 2;

Fig. 4 a fragmentary vertical section on the line IV—IV of Fig. 2; and

Fig. 5 a perspective view of one of the connecting devices which are permanently secured at the opposite ends of each pan unit.

Referring to the drawings by numerals, 1 designates the two side bars or pan-unit connecting members, each of which is provided with a series of spaced pairs of horizontally alined openings or slots 2. Each individual pan 3 is formed of sheet metal and has the surplus metal at the corners thereof bent against the end walls to form a pair of corner folds 4 at each end of the pan. The usual reinforcing wire 5 extends around the upper edge of the pan 3, the upper edges of the side walls of the pan being bent outwardly and downwardly around the wire.

A connecting device 6 of sheet metal is permanently held to each end of each pan 3, the upper edge of said device being bent outwardly and downwardly around the end portion of the reinforcing wire 5 to securely hold the device against vertical movement relatively to the pan. The upper edges of the end walls of the pans are bent outwardly and downwardly over the curled or rolled upper edges 7 of the connecting devices. The end portions of each connecting device 6 are cut away to form open-ended horizontally extending slots 8, and the body portion of each device is cut away between the inner ends of said slots to form an opening 9. The webs of metal between slots 8 and openings 9 are pressed outwardly to form a pair of substantially U-shaped lugs or projecting portions 10 on each connecting device, adapted to extend through one of the pairs of openings 2 in the connecting members or side bars 1.

The U-shaped projecting portions form lugs adapted to interlock with the connecting members and having horizontal openings 11 therethrough adapted to receive cotter-pins 12 or similar locking devices for detachably holding the connecting members 1 against the ends of the pan units in interlocked relation with the connecting devices 6. The corner folds 4 at each end of each pan 3 are interlocked with the end portions of the adjacent connecting device 6, each corner fold overlying the adjacent end portion of the device below slot 8 and having its upper portion confined between the end wall of the pan 3 and the portion of the connecting device above said slot. The inner edges of the corner folds engage the inner ends of the slots 8, as shown in Fig. 2.

By confining the end portions of the connecting devices below slots 8 between the corner folds 4 and the end walls of the pans it will be observed that the connecting devices are securely held against swinging outwardly about the wire 5 as a pivot, and that spreading or rocking of the connecting bars 1 relatively to each other and the pans 3 is thus prevented without the necessity of employing end cross bars or intermediate transverse connecting members between the side bars or connecting members 1. By confining the upper ends of the corner folds 4 between the connecting devices and the pan walls unfolding of the corner folds by an outward pull on the lugs 10 is prevented. The engagement of the inner edges of the corner folds with the inner ends of slots 8 prevents endwise movement of the connecting devices relatively to the pans 3. From the foregoing it will be noted that the connecting devices 6 are permanently held to pans 3 in such a way that they cannot move endwise, vertically, or laterally, and that no part of said devices or the means for holding the same in place extends through the pan walls or projects into the interior of the pan in any manner.

It will be obvious that opening 9 in the devices 6 may be omitted and said devices formed with a single lug or projection, and that said lugs or projections 10 may be of any suitable form and provided with vertical instead of horizontal openings, if desired. It will be obvious also that the bars 1 may be of any suitable length to connect any desired number of pan units together, the usual practice being to connect four pan units. The pairs of openings 2 are preferably so arranged that the individual pans will be held in spaced relation, as shown in Fig. 1, to afford an unobstructed passage for heated air between the pans to promote uniform baking of the loaf. By providing each connecting device 6 with two spaced projections 10 in horizontal alinement a firm support for each pan on the bars is afforded.

What I claim is:

1. An interchangeable pan unit for a knockdown multiple pan, comprising an individual pan formed with corner folds and having a reinforcing wire held thereto and extending around the outer sides of the pan walls adjacent the upper edge of the pan, and a pair of oppositely disposed connecting devices secured at their upper edges to the reinforcing wire and each having connections at the ends thereof with two adjacent corner folds for holding the same against movement away from the adjacent pan wall.

2. An interchangeable pan unit for a knockdown multiple pan comprising a rectangular pan formed with a pair of corner folds at each end, a reinforcing wire extending about the upper edges of the pan, and a connecting device at each end of the pan secured at its upper edge to said wire and having its ends interlocked with the adjacent corner folds.

3. An interchangeable pan unit for a knockdown multiple pan comprising a rectangular pan formed with a pair of corner folds at each end, a reinforcing wire extending about the upper edges of the pan, and a connecting device at each end of the pan secured at its upper edge to said wire and having its ends interlocked with the adjacent corner folds, each of said devices being formed with an outwardly projecting portion adapted to extend through an opening in a connecting member, said projecting portions being provided with apertures to receive a locking device.

4. The combination of a series of rectangular pans arranged side by side in a single row and each having corner folds bent in pairs against the exterior of the end walls thereof and reinforcing wires extending about their upper edges, connecting devices lying against the ends of the pans and secured at their upper edges to said wires, each of said devices having end portions confined between the adjacent end wall of the pan and the corner folds, and a pair of rigid connecting members extending along the end walls of the series of pans and detachably held to said devices.

5. The combination of a series of rectangular pans arranged side by side in a single row and each having corner folds bent in pairs against the exterior of the end walls thereof and reinforcing wires extending about their upper edges, connecting devices lying against the ends of the pans and secured at their upper edges to said wires, each of said devices having end portions confined between the adjacent pan wall and corner folds and being formed with an outwardly extending portion having an aperture therethrough, a pair of rigid connecting members at opposite sides of the series of pans having spaced openings through which the outwardly extending portions of the connecting devices project, and fastening devices extending through the apertures in said outwardly extending portions for detachably locking the connecting members in place.

6. The combination of a series of rectangular pans arranged side by side in a single row and each having corner folds bent in pairs against the exterior of the end walls thereof and reinforcing wires extending about their upper edges, connecting devices lying against the ends of the pans and secured at their upper edges to said wires, each of said devices having slotted ends interlocked with the adjacent edges of the corner folds, and a pair of rigid connecting members at opposite sides of the series of pans detachably held to said devices.

7. The combination of a series of rectangular pans arranged side by side in a single row and each having corner folds bent in pairs against the exterior of the end walls thereof and reinforcing wires extending about their upper edges, connecting devices lying against the ends of the pans and secured at their upper edges to said wires, each of said devices having longitudinally slotted end portions interlocked with the adjacent corner folds and an intermediate outwardly projecting portion having an aperture therein, a pair of rigid connecting members at opposite sides of the series of pans having openings through which said projecting portions extend, and fastening devices extending through the apertures in said projecting portions.

8. The combination of a series of rectangular pans arranged side by side in spaced relation in a single row, each of said pans having its upper edge bent around a reinforcing wire and having corner folds bent in pairs against the end walls thereof, connecting devices at the ends of the pans having their upper edges bent around the reinforcing wires under the pan edges and having inwardly extending open-ended slots at their ends through which the corner folds extend with the inner edges of said folds in engagement with the inner ends of the slots, and a pair of rigid connecting members at opposite sides of the series of pans detachably held to said devices.

9. The combination of a series of rectangular pans arranged side by side in spaced relation in a single row, each of said pans having its upper edge bent around a reinforcing wire and having corner folds bent in pairs against the end walls thereof, connecting devices at the ends of the pans having their upper edges bent around the reinforcing wires under the pan edges and having inwardly extending open-ended slots at their ends through which the corner folds extend with the inner edges of said folds in engagement with the inner ends of the slots, each of said devices being formed with an outwardly extending intermediate portion, a pair of rigid connecting members at opposite sides of the series of pans having spaced openings through which the outwardly extending portions of said devices extend, and fastening devices for detachably holding said members and devices in interlocked relation.

10. An interchangeable pan unit for a knockdown multiple pan comprising a rectangular pan body having a reinforcing wire held to the upper edge thereof and corner folds bent in pairs against the end walls thereof, and connecting devices permanently held to the ends of the pan body, each of said devices comprising a metal plate having its upper edge bent around the reinforcing wire and formed with two spaced outwardly pressed U-shaped lugs, the ends of said plates being slotted and interlocked with the corner folds with the upper ends of the corner folds confined between the plates and the pan walls and the end portions of the plates below said slots confined between the corner folds and pan walls.

11. The combination of a series of pans arranged side by side and each having a reinforcing wire held around its upper edge and pairs of corner folds bent against its end walls, connecting devices held to the ends of each pan having the upper edges thereof bent around the reinforcing wire and formed with slotted ends the lower portions of which under-lie the corner folds and the upper portions of which over-lie the corner folds, each of said devices being formed with a pair of spaced U-shaped projections, connecting bars extending along opposite sides of the series of pans having spaced apertures through which said U-shaped projections extend, and fastening devices engaging the outer sides of said bars and extending through the openings in said U-shaped projections.

This specification signed this twenty-seventh day of March, A. D. 1919.

HARRY J. HAIGH.